United States Patent [19]

Higginbottom

[11] 4,060,504

[45] Nov. 29, 1977

[54] EMULSIFIABLE RESOLES HAVING DISPERSED INERT SALTS

[75] Inventor: Harold P. Higginbottom, Wilbraham, Mass.

[73] Assignee: Monsanto Company, St. Louis, Mo.

[21] Appl. No.: 613,651

[22] Filed: Sept. 15, 1975

[51] Int. Cl.$^2$ .......................... C08L 89/00; C08K 3/18
[52] U.S. Cl. ............................................ 260/7; 260/60; 260/29.3; 428/264; 428/290
[58] Field of Search .......................... 260/7, 29.3, 60, 6

[56] References Cited

U.S. PATENT DOCUMENTS

| | | | |
|---|---|---|---|
| 2,758,101 | 8/1956 | Shappell | 260/29.3 |
| 3,404,198 | 10/1968 | Guyer | 260/840 |
| 3,666,694 | 5/1972 | Ingram | 260/7 |
| 3,763,104 | 10/1973 | Buchanan | 260/60 |
| 3,862,060 | 1/1975 | Anderson | 260/7 |

*Primary Examiner*—Theodore E. Pertilla
*Attorney, Agent, or Firm*—Joseph S. Nelson; William J. Farrington; James C. Logomasini

[57] ABSTRACT

This invention relates to high efficiency stable aqueous emulsifiable resoles which contain low concentrations of free phenol and free aldehyde causing less pollution than prior art resoles. Said resoles are catalyzed with alkaline earth metal hydroxides and neutralized with oxalic acid or its acid salts providing colloidal inert insoluble oxalate salts dispersed in said resoles. Said resole and said salts being emulsifiable with protein type emulsifiers providing stable emulsions when water in excess of the water tolerance of the resole is added.

18 Claims, No Drawings

EMULSIFIABLE RESOLES HAVING DISPERSED INERT SALTS

BACKGROUND OF THE INVENTION

Very stable resole-type phenolic resin emulsions have been conveniently formed using protein type emulsifiers. However, these type emulsifiers cannot be used with resole solutions containing polyvalent cations such as calcium, barium and strontium. This has limited the choice of catalysts and salts that can be employed in the manufacture of phenolic resins containing proteins unless the cations are removed prior to protein addition. This limitation can be undesirable to both cost and manufacturing convenience.

During the normal manufacture of resole-type liquid phenolic resins a basic catalyst is utilized. To stabilize the finished resin, the base is usually neutralized at the end of the manufacturing process. The neutralization results in the formation of either a soluble or insoluble salt depending on the base catalyst and neutralizing acid employed. Since the presence of excess salt can be deliterious to certain end use properties, it is often removed from the resin by techniques such as insoluble salt filtration or ion exchange. From both a cost and pollution criteria, it is desirable to avoid removing the salt from the resin. However, if the salt is left in the resin it ideally should be of a type that does not degrade end use properties and that may even enhance end use performance.

FIELD OF THE INVENTION

In the present invention emulsifiable phenolic resins containing protein emulsifiers can be used in the presence of polyvalent cations such as calcium and barium. This is done by first converting the cation to a highly insoluble oxalate salt. The cation so inerted does not interfere with the efficiency of the protein as a protective colloid and stable phenolic emulsions can be formed.

The calcium and barium oxalate can be formed in situ in the resin as very fine insoluble colloidal particles which results in very stable dispersions with no tendency to settle or coagulate. The highly insoluble nature of these salts make them, in principle, as a highly inert dispersed filler with little tendency to adversely affect key properties, e.g., moisture resistance. Because the dispersions are so fine, the resins can be pumped, sprayed and generally handled like salt free resins.

The resins of this invention can be diluted to any solids level. The protein emulsifier in a phenolic resin containing the oxalate dispersion not only acts as a protective colloid for phenolic resin particles (emulsifies) but also prevents flocculation of the oxalate salt. This dual action allows highly dilute but stable dispersions to be formed when desired which will show minimal tendency to settle or flocculate.

The combination of the fine particle calcium or barium oxalate dispersion with a phenolic resole resin produces an unexpected enhancement in the viscosity of the system. This enhancement in viscosity can be an advantage in many applications. For example, the pick up and retention of resin on some substrates is increased as viscosity increases. The use of the dispersed salt gives an alternative to viscosity control which is usually dependent on varying the molecular weight and solids content of the resin itself.

SUMMARY OF THE INVENTION

The above described needs of the art are fulfilled by the present invention:

An improved stable aqueous solution of an emulsifiable resole wherein the solution has a pH in the range 6 to 8.5 and contains less than 2 percent of free phenol, less than 2 percent of free formaldehyde, said resole has a number average molecular weight of less than 300, preferably 180 to 300, a water tolerance between about 100 and 800 percent, a combined formaldehyde to phenol molar ratio in the range of 2.0:1 to 2.9:1, and contains sufficient methylolated 2,2'-and 2,4'-dihydroxydiphenylmethanes, preferably 5 to 90% by weight of methylolated dihydroxydiphenylmethanes of which between 5 to 50% by weight are methylolated 2,2'and 2,4'-dihydroxydiphenylmethanes to inhibit crystallization of the resole solution, said resole being prepared with a catalyst comprising alkaline earth metal hydroxides selected from the group consisting of calcium, barium, strontium and mixtures thereof wherein said improvement comprises: said pH being adjusted with a compound selected from the group consisting of oxalic acid, ammonium oxalate and mixtures thereof providing a stable colloidal dispersion of insoluble oxalate salts of said alkaline earth metal ions in said solution, said resole and said salts being emulsifiable by about 1 to 12 percent by weight of an emulsifier based on the weight of said resole, said emulsifier being selected to provide a stable emulsion of the resole and salt when water in excess of the water tolerance is added to said solution.

Another aspect of the invention is directed to a process for preparing the stable aqueous solution of an emulsifiable resole resin which comprises:

A process for preparing an aqueous storage stable emulsifiable resole solution which comprises:

a. reacting 1.0 mole phenol with from 0.05 to 0.30 moles formaldehyde under acid conditions for formation of novolac resin, preferably 0.001 to 0.02 mol equivalent of a soluble acid catalyst per mol of phenol at a temperature range of 60°–200° C. wherein said acid having a pK of less than 5, most preferably less than 2, b. adding from 1.75 to 3.5 moles formaldehyde and reacting under basic conditions to produce a resole of molecular weight less than 300, and containing less than 2 weight percent free phenol, said basic conditions being provided by a catalyst comprising alkaline earth hydroxides selected from the group consisting of calcium, barium, strontium and mixtures thereof, said catalyst having a pK greater than about 9, said reacting being carried out at from about 40° to 80° C., preferably from about 50°–70° C.

c. adjusting the pH of the aqueous resole to between about 6 and 8.5, preferably 7 to 8 with a compound selected from the group consisting of oxalic acid, ammonium oxalate and mixtures thereof providing a stable colloidal dispersion of insoluble oxalate salts of said alkaline earth metal ions in said solution said resole and said salts being emulsifiable in from about 1 to 12 percent by weight of an emulsifier based on the weight of said resole, selected to provide a stable emulsion when water in excess of the water tolerance of said resole is added to the resole solution.

PREFERRED EMBODIMENTS

Emulsifiable resole resins containing dispersed oxalate salts can be essentially the resins disclosed in U.S. Pat. No. 3,956,205 to Harold P. Higginbottom, wherein the improvement comprises that the resins are prepared using calcium or barium hydroxide and neutralized with oxalic acid or ammonium oxalate.

Emulsifiable antipunking resole resins containing dispersed oxalate salt can be the resin disclosed in U.S. Pat. No. 3,956,205 to Harold P. Higginbottom, wherein the improvement comprises that the resins are prepared using calcium or barium hydroxide and neutralized with oxalic acid or ammonium oxalate.

Another aspect of the invention is directed to storage stable emulsified aqueous phenolic resin systems containing dispersed oxalate salt obtained by adding water beyond the water tolerance point to the emulsifiable systems.

The aqueous solutions of resoles of the present invention can be conveniently prepared by a two-stage reaction disclosed in the examples. The base catalyzed reaction of from 1.0 to 4.0 moles formaldehyde with one mole of phenol is conducted in the presence of calcium or barium hydroxide. Additional bases such as sodium hydroxide or organic amines may be added as cocatalysts and pH regulators for the resin system. Typically, between 0.05 and 0.30 mole equivalents of total base per mole of original phenol are utilized. The reaction is carried out at a temperature range of from 40° to 80° C.

The resole reaction is preferably carried out with aqueous formalin solutions containing between 30 and 70 percent formaldehyde. When the reaction is complete the solids content of the aqueous resole can be adjusted to the range of 40 to 70 percent by addition of water or by vacuum stripping to remove water.

The aqueous resoles of the present invention containing the stable dispersed oxalate salts can be used in the presence of a variety of formaldehyde scavengers. Suitable formaldehyde scavengers include sodium sulfite, sodium cyanide and nitrogen containing organic compounds soluble in the resole, of molecular weight less than 300, containing at least 1 NH group per molecule reactive with formaldehyde. Examples include ammonia, primary and secondary amines, urea, substituted ureas, primary amides, dicyandiamide, guanidines and aminotriazines such as melamine, guanamine and benzoguanamine. The formaldehyde scavenging reaction is carried out at the end of the resole reaction preferably at a temperature in the range of 20° to 60° C., to minimize oligomerization of the resole. The amount of scavenger added can vary within very wide limits, up to 1.0 mole per mole of phenol in the original reaction mixture. However, it is preferred to use between 0.5 and 1.5 mole equivalents of scavenger per mole of free formaldehyde present at the end of the resole reaction.

The main catalyst for the resole stage is barium or calcium hydroxide. Supplementary bases which can be used with the main catalyst include alkali metal hydroxides such as lithium hydroxide, sodium hydroxide and potassium hydroxide, alkali metal carbonates such as sodium carbonate and potassium carbonate, aqueous ammonia and amines of molecular weight less than 300. At the end of the reaction the barium and calcium hydroxide are neutralized with oxalate yielding a highly insoluble dispersed salt. The supplementary bases are partially neutralized if necessary and function to control the resin pH between 6 and 8.5. Preferably, the pH is adjusted between 6.5 and 8.0.

The formation of the insoluble oxalate can conveniently be done by adding solid oxalic acid, (usually oxalic acid dihydrate) solid ammonium oxalate or water solutions of these to the resole system. Factors such as agitation and temperature are important in obtaining a fine particle dispersion.

The emulsifiable systems are prepared by addition of between 1 and 12 parts by weight of emulsifier per 88 and 99 parts of resole. An emulsifier which will contribute to formation of stable phenolic resin emulsions upon the dilution of the emulsifiable system with water is used. The preferred emulsifiers are proteinaceous compounds which are soluble in aqueous media at a pH of from 6 to 8.5. Aqueous solutions of the proteinaceous compounds are prepared in the presence of sufficient alkali metal hydroxide, ammonium hydroxide, or organic amines such as triethylamines to provide a pH in the range of 7 to 10. The viscosity of the protein solution can be controlled by the addition of amides or ureas. Suitable proteinaceous compounds include casein and soya protein of molecular weights ranging from 100,000 to 400,000. For example, with casein, an aqueous solution is prepared by dissolving urea in water and casein is added to from a slurry. After some 30 to 60 minutes, aqueous sodium hydroxide is added and mixing is continued until a solution has formed. The solution is then added to the aqueous resole. Other emulsifier systems which may be conveniently used are combinations of gum arabic any polysaccharides consisting essentially of mannose and galactose units or consisting essentially of D-mannuronic and L-guluronic acid units wherein the ratio of the gum arabic to the other polysaccharides is about 0.5 to about 20:1.

The clear, one phase, homogeneous, emulsifiable resins of this invention may be easily converted to resin in water emulsions by the simple addition of water with sufficient agitation to permit effective blending of the water. This can normally be accomplished with the use of conventional propellor, blade or turbine agitators. Optimum emulsification is usually obtained by adjusting the pH above 8 with ammonia or some other base just prior to water addition. Depending upon the degree of dilutibility of the emulsifiable resin, i.e., degree of advancement, the formation of phenolic resole emulsion may be first characterized by a slight lowering of viscosity as the initial water added dissolves, followed by a rapid increase in viscosity with the formation of a water-in-oil emulsion and a peak viscosity at the point at which the system inverts to a resin in water emulsion. Such is the case with relatively high degree of advancement of emulsifiable resin systems having a relatively low degree of water dilutibility, e.g., 20 percent. Alternately, with lower advanced phenolic resole emulsifiable resins, emulsification may be accompanied by no noticeable increase in viscosity and result directly in a resin in water emulsion.

In either case, the resin in water emulsions formed are characterized by excellent stability with regard to sedimentation and shear. Particle size is also extremely small, in all cases being below $2\mu$ and normally averaging $0.02-0.8\mu$.

The emulsified resin systems of this invention are useful as binders for thermal insulation and in the impregnation of cellulosic sheet members. Typical resin solids contents of the emulsified phenolic for cellulosic sheet impregnation range from 5 percent up to 45 weight percent resin solids. Commonly, the quantity of resin falls in the range of from about 8 to 25 percent solids. Impregnation is accomplished by any convenient means, whereupon the substrate material is dried to lower volatiles content and then is heated to advance the resin to a desired degree. Typical quantities of resin in a treated sheet range from about 10 to 40 weight percent with amounts ranging from about 15 to 30 weight percent being particularly common. The resin treated sheet members are employed in the manufacture of automotive oil filters, air filters and fuel filters, the individual sheets being folded, convoluted, etc., and then packaged in an appropriate filter cartridge, as all of those skilled in the art fully appreciate.

EXAMPLE 1

Acid Stage Reaction

A phenol formaldehyde acid catalyzed condensate is prepared by reacting 0.25 mole of aqueous formaldehyde (50 percent) per 1 mole of phenol in the presence of 0.004 mole of oxalic acid at atm reflux until the formaldehyde consumption exceeds 98 percent.

Base Stage Reaction

The cooled acid stage reaction product is neutralized with 0.035 mole of sodium hydroxide and 1.06 mole of aqueous formaldehyde (50 percent) is added. Calcium hydroxide (0.032 moles) is added to reaction mixture below 60° C. The reaction mixture is then held at 70° C., reflux until the unreacted formaldehyde content drops to 0.3 percent. The reaction is cooled to 40° C., and 0.030 moles of solid oxalic acid dihydrate is added with good agitation. The resulting resin is cloudy because of the fine dispersion of calcium oxalate. Six parts of a 20 percent casein protein solution is mixed with 100 parts of aqueous resin to form an emulsifiable system. The resin has a solids of 56.7 percent, a Brookfield viscosity of 195 cps. at a pH of 8.1.

Preparation of the casein protein solution is accomplished as follows: urea (20 parts) is dissolved in water (59 parts) and casein (20 parts) is added and slurried. After 30 minutes, 29 percent ammonia (1 part) is added and allowed to mix for 30 minutes. This solution may then be added to the resin.

EXAMPLE 2

A phenol-formaldehyde acid catalyzed condensate is prepared by reacting 0.08 mole of aqueous formaldehyde (50 percent) per 1.0 mole of phenol in the presence of 0.004 mole sulfamic acid at atm. reflux until the formaldehyde consumption exceeds 98 percent.

Base Stage Reaction

The cooled acid stage reaction product is neutralized with 0.035 moles of sodium hydroxide and 2.90 mole of aqueous formaldehyde (50 percent) is added. Calcium hydroxide (0.032 moles) is added to the reaction mixture below 60° C. The reaction mixture is then reacted at 70° C., reflux until the unreacted formaldehyde content drops to 6.8 percent. The reaction is cooled to 50° C., and 0.26 mole of aqueous ammonia (29 percent) and 0.55 mole of urea are added as formaldehyde scavengers. The reaction is neutralized above 40° C., with 0.015 mole boric acid and 0.033 mole oxalic acid dihydrate with good agitation. The resulting resin is cloudy because of the stable dispersion of calcium oxalate. The resin has a solids of 51.8 percent, an ash content of 1.3 percent, a Brookfield viscosity of 160 cps at a pH of 7.3. Five parts of a 20 percent soya protein solution is mixed with 100 parts of aqueous resin to form an emulsifiable system. A very stable emulsion can be formed on dilution.

Preparation of the soya protein solution is accomplished as follows: urea (30 parts) is dissolved in water (49 parts) and soya protein (20 parts) is added and slurried. After 30 minutes, 29 percent ammonia (1 part) is added and allowed to mix for 30 minutes. This solution may then be added to the resin.

EXAMPLE 3

The procedure of Example 2 is repeated except the final neutralized resin is centrifuged to remove the suspended calcium oxalate salt. The resulting resin is clear and has a solids of 51.1 percent, an ash content of 0.4 percent, a Brookfield viscosity of 30 cps at a pH of 7.3. Five parts of a 20 percent soya protein solution (as prepared in Example 2) is mixed with 100 parts of aqueous resin to form an emulsifiable system. A very stable emulsion can be formed on dilution.

EXAMPLE 4

The procedure of Example 2 is repeated except 0.066 mole of acetic acid is used in place of the oxalic acid. The resulting resin is clear because soluble calcium acetate is formed. The resin has a solids of 52.2 percent, as ash content of 1.3 percent, a Brookfield viscosity of 34 cps and a water tolerance of 250 percent at a pH of 7.3. Five parts of a 20 percent soya protein solution (as prepared in Example 2) is mixed with 100 parts of aqueous resin to form an emulsifiable system. An unstable emulsion is formed on dilution with water with gummy resin precipitation occurring.

EXAMPLE 5

Acid Stage Reaction

A phenol-formaldehyde acid catalyzed condensate is prepared by reacting 0.08 mole of aqueous formaldehyde (50 percent) per 1.0 mole of phenol in the presence of 0.004 mole sulfamic acid at atm. reflux until the formaldehyde consumption exceeds 98 percent.

Base Stage Reaction

The cooled acid stage reaction product is neutralized with 0.035 mole of sodium hydroxide and 2.90 mole of aqueous formaldehyde (50 percent) is added. Barium hydroxide monohydrate (0.032 moles) is added to the reaction mixture below 60° C. The reaction mixture is then reacted at 70° C., reflux until the unreacted formaldehyde content drops to 7.0 percent. The reaction is cooled to 50° C., and 0.26 mole of aqueous ammonia (29 percent) and 0.55 mole of urea are added as formaldehyde scavengers. The reaction is neutralized at 40° C., with 0.033 mole oxalic acid with good agitation. The resulting resin is cloudy because of the stable dispersion of barium oxalate. The resin has a solids of 54.9 percent, a Brookfield viscosity of 125 cps, and a pH of 7.3. Five parts of a 20 percent soya protein solution (as prepared in Example 2) is mixed with 100 parts of aqueous resin to form an emulsifiable system. A very stable emulsion can be formed on dilution.

EXAMPLE 6

The procedure of Example 2 is repeated except that only 0.20 mole of aqueous ammonia (29 percent) is added and the resin is neutralized with 0.033 mole of ammonium oxalate monohydrate. The resulting resin is cloudy because of the stable dispersion of cacium oxalate. The resin has a solids of 52.4 percent, an ash content of 1.3 percent, a Brookfield viscosity of 180 cps at a pH of 7.3. Five parts of a 20 percent soya protein solution is mixed with 100 parts of aqueous resin to form an emulsifiable system. A very stable emulsion cna be formed on dilution.

EXAMPLE 7

Acid Stage Reaction

A phenol-formaldehyde acid catalyzed condensate is prepared by reacting 0.16 mole of aqueous formaldehyde (50 percent) per 1.0 mole of phenol in the presence of 0.004 mole sulfamic acid at atm. reflux until the formaldehyde consumption exceeds 98 percent.

Base Stage Reaction

The cooled acid stage reaction product is neutralized with 0.023 mole of sodium hydroxide and 2.74 mole of aqueous formaldehyde (50 percent) is added. Calcium hydroxide (0.044 moles) is added to reaction mixture below 60° C. The reaction mixture is then reacted at 70° C., reflux until the unreacted formaldehyde content drops to 7.0 percent. The reaction is cooled to 55° C., and 0.17 mole of dicyandiamide and 0.04 mole of melamine are added and held at 55° C., for one-half hour. The reaction is cooled to 50° C., and 0.63 mole urea and 0.064 mole ammonia are added. The reaction is then neutralized at 40° C., with 0.045 mole of oxalic acid with good agitation. The resulting resin has a stable dispersion of calcium oxalate. Five parts of a 20 percent soya protein solution (as prepared in Example 2) is mixed with 100 parts of aqueous resin to form an emulsifiable system. The resin has a solids of 55.4 percent, an ash of 1.53 percent, a Brookfield viscosity of 267 cps at a pH of 7.5. A very stable emulsion can be formed on dilution.

EXAMPLE 8

ACID STAGE REACTION

An acid catalyzed reaction identical to Example 17 is run.

BASE STAGE REACTION

The cooled acid stage reaction product is neutralized with 0.03 mole of sodium hydroxide and 2.38 mole of aqueous formaldehyde (50 percent) is added. Calcium hydroxide (0.14 mole) is added to the reaction mixture below 60° C. The reaction mixture is then reacted at 65° C., reflux until the unreacted formaldehyde content drops to 2.0 percent. The reaction is cooled to 50° C., and 0.33 mole of urea and 0.064 mole of aqueous ammonia (29 percent) are added as formaldehyde scavengers. The reaction is neutralized with good agitation at 40° C., with 0.14 mole of oxalic acid. The cloudy resin has a solids of 52.5 percent, an ash of 3.0 percent, a Brookfield viscosity of 2275 cps at a pH of 6.7.

If the above resin is centrifuged to remove the insoluble calcium oxalate dispersion, the resulting clear resin has a solids of 49.3 percent and ash of 0.48 percent, a Brookfield viscosity of only 25 cps at a pH of 6.7.

Ten parts of a 20 percent soya protein solution (as prepared in Example 2) is mixed with 100 parts of dispersed salt resin and this mixture forms a very stable emulsion upon dilution.

Emulsion and Dispersion Stability Test

In order to test the emulsification stability and stability of the dispersed salt to flocculation and settling, the following test is employed. A 100 gm. sample of dispersed salt resin containing protein emulsifier is charged to a 2 liter mixing vessel equipped with a 2 inch diameter 3-blade stirrer. The pH of the resin is adjusted to the 8.0 to 8.5 range with aqueous ammonia. The stirrer is then set at 200 rpm while sufficient water is added slowly to dilute the resin solids content to approximately 5 percent. A 100cc charge of the diluted emulsion is placed in a conical tip centrifuge tube graduated to 0.05cc. The tube is supported in a vertical position for 24 hours. A sample is considered to have excellent emulsifiability and dispersed salt stability if after 24 hours no resin precipitation is observable and the maximum sedimate is less than 0.05cc. Resins prepared by the procedures of Examples 1 through 8 are all excellent by this test with the exception of Example 4 material containing the soluble calcium salt which fails the test.

Moisture Sensitivity Test

The desireable effect of the calcium oxalate salt on reducing moisture sensitivity of cured resin films is demonstratable by the following test. Resins made according to procedures of Examples 2, 3 and 4 are compared. The phenolic portion of each resin is essentially the same and each resin has an equivalent sodium ion content. Example 2 contains the stable dispersion of calcium oxalate. Example 3 has the stable dispersion clearly removed by centrifuging. Example 4 has the calcium in the form of soluble calcium acetate.

Resin films are cast on precleaned microscope slides by preheating the slides on the surface of a hot place at 100° C. A few drops of the as made resin are placed on the heated slide and a thin uniform film is developed by applying pressure with a spatula and spreading resin on slide as volatiles are lost. After about 5 minutes the resin coated slide is removed from the hot plate and placed in a curing oven for 15 minutes at 177° C. The cured slides are then soaked in water at 25° C., and the percent resin film separation from the glass slides after 24 and 48 hours is measured.

Cured films on glass slides are also prepared as described above from resins of Examples 2, 3 and 4 after first adding 0.1 percent A-1100 silane to each on a solids base. These slides are then subjected to a 3 hour immersion in boiling water. After cooling and equilibrating 1 hour at room temperature, the percent resin film separation is measured.

Results of these tests are shown in the following table:

TABLE 1

| Resin Type | 24 hour Soak* | 48 hour Soak* | 3 hour Boil |
|---|---|---|---|
| Example 2 | 0% | 50% | |
| Example 3 | 10% | 80% | |
| Example 4 | 80% | 100% | |
| Example 2 + Silane | | | 0% |
| Example 3 + Silane | | | 20% |
| Example 4 + Silane | | | 70% |

*Water soak at 25° C.

The data shows clearly that the calcium oxalate containing resin (Example 2) has significantly better moisture resistance than the soluble calcium salt resin (Example 4). Also, surprisingly, the calcium oxalate containing resin shows better moisture resistance than the same resin which has the calcium oxalate removed (Example 3). This is the case both with and without silane coupling agents being present.

What is claimed is:

1. An improved stable aqueous solution of an emulsifiable resole wherein the solution has a pH in the range 6 to 8.5 and contains less than 2 percent of free phenol, less than 2 percent of free formaldehyde, said resole has a number average molecular weight of less than 300, a water tolerance between about 100 and 800 percent, a combined formaldehyde to phenol molar ratio in the range of 2.0:1 to 2.9:1, and contains sufficient methylolated 2,2'-and 2,4'-dihydroxydiphenylmethanes to inhibit crystallization of the resole solution, said resole being prepared with a catalyst comprising alkaline earth metal hydroxides selected from the group consisting of calcium, barium, strontium and mixtures thereof wherein said improvement comprises: said pH being adjusted with a compound selected from the group consisting of oxalic acid, ammonium oxalate and mixtures thereof providing a stable colloidal dispersion of insoluble oxalate salts of said alkaline earth metal ions in said solution, said resole and said salts being emulsifiable by about 1 to 12 percent by weight of an emulsifier based on the weight of said resole, said emulsifier being selected to provide a stable emulsion of the resole and salt when water in excess of the water tolerance is added to said solution.

2. The aqueous solution of claim 1, wherein the resole has a number average molecular weight in the range of 180 to 300 and comprises between 5 and 90 weight percent of methylolated dihydroxydiphenylmethanes of which between 5 and 50 weight percent are methylolated 2,2'-and 2,4'-dihydroxydiphenylmethanes.

3. The aqueous solution of claim 1, wherein the resole comprises less than 1 weight percent free phenol and less than 1 weight percent free formaldehyde.

4. The aqueous solution of claim 1, wherein reduction of formaldehyde to less than 2 percent based on the weight of the resole is achieved with a formaldehyde scavenger.

5. The aqueous solution of claim 4, wherein the scavenger is a soluble nitrogen organic compound of molecular weight less than 300, containing at least one N—H group per molecule which is reactive with formaldehyde.

6. The aqueous solution of claim 1, wherein the emulsifier is a proteinaceous compound soluble in aqueous media at a pH of 6 to 8.5.

7. The aqueous solution of claim 6, wherein the proteinaceous compound is casein.

8. The aqueous solution of claim 6, wherein the proteinaceous compound is soya protein.

9. An aqueous emulsion obtained by adding water in excess of the water tolerance to the aqueous solution of claim 1 containing a proteinaceous compound.

10. A process for preparing an aqueous storage stable emulsifiable resole solution which comprises:

a. reacting 1.0 mole phenol with from 0.05 to 0.30 moles formaldehyde under acid conditions for formation of novolac resin, b. adding from 1.75 to 3.5 moles formaldehyde and reacting under basic conditions to produce a resole of molecular weight less than 300, and containing less than 2 weight percent free phenol, said basic conditions being provided by a catalyst comprising alkaline earth hydroxides selected from the group consisting of calcium, barium, strontium and mixtures thereof, c. adjusting the pH of the aqueous resole to between about 6 and 8.5 with a compound selected from the group consisting of oxalic acid, ammonium oxalate and mixtures thereof providing a stable colloidal dispersion of insoluble oxalate salts of said alkaline earth metal ions in said solution said resole and said salts being emulsifiable in from about 1 to 12 percent by weight of an emulsifier based on the weight of said resole, selected to provide a stable emulsion when water in excess of the water tolerance of said resole is added to the resole solution.

11. The process of claim 10, wherein the novolac reaction stage is carried out in the presence of 0.001 to 0.02 mole equivalents of a soluble acid catalyst per mole of phenol at a temperature in the range of 60°–200° C., and wherein the acid has a pK of less than 5.

12. The process of claim 11, wherein the catalyst has a pK of less than 2 and wherein the temperature is in the range of 100° to 120° C.

13. The process of claim 10, wherein the resole reaction stage is carried out in the presence of a soluble basic catalyst of pK greater than about 9.0 at a temperature in the range of 40° to 80° C., the concentration of base being between about 0.05 to 0.3 mole equivalent per mole of phenol in excess of the amount required to neutralize the acid of the novolac reaction stage.

14. The process of claim 13, wherein the temperature is in the range of 50°–70° C., and the case is selected from the group consisting of alkali metal hydroxides, alkali metal carbonates, alkaline earth hydroxides, ammonia and amines of molecular weight less than 300.

15. The process of claim 10, wherein a soluble nitrogen containing organic compound of molecular weight less than 300 containing at least one N—H group reactive with formaldehyde is added as a formaldehyde scavenger to the resole after the free phenol content has dropped to less than 2 weight percent of the resole and is reacted with the free formaldehyde to reduce the formaldehyde concentration to less than 2 weight percent of the resole.

16. The process of claim 15, wherein the formaldehyde scavenging reaction is carried out at a temperature in the range of 20°–60° C., and the scavenger is selected from the group consisting of ammonia, primary and secondary amines, urea, substituted ureas, primary amides, dicyandiamide, guanidines and aminotriazines.

17. The process of claim 10, wherein the emulsifier is a proteinaceous compound soluble in aqueous media at a pH in the range of 6 to 8.5.

18. The process of claim 17, wherein the proteinaceous compound is selected from the group consisting of casein and soya protein.

* * * * *